United States Patent
Lee et al.

(10) Patent No.: US 8,645,095 B2
(45) Date of Patent: Feb. 4, 2014

(54) SYNCHRONOUS MULTI-TEMPERATURE SENSOR FOR SEMICONDUCTOR INTEGRATED CIRCUITS

(75) Inventors: Seong Seop Lee, Icheon-si (KR); Saeng Hwan Kim, Suwon-si (KR)

(73) Assignee: SK Hynix Inc., Gyeonggi-do (KR)

( * ) Notice: Subject to any disclaimer, the term of this patent is extended or adjusted under 35 U.S.C. 154(b) by 493 days.

(21) Appl. No.: 12/946,928

(22) Filed: Nov. 16, 2010

(65) Prior Publication Data

US 2011/0208471 A1 Aug. 25, 2011

(30) Foreign Application Priority Data

Feb. 25, 2010 (KR) .................. 10-2010-0017336

(51) Int. Cl.
*G06F 3/01* (2006.01)
*G06F 3/00* (2006.01)
*G06F 3/02* (2006.01)
*G06F 3/023* (2006.01)

(52) U.S. Cl.
USPC ............ 702/124; 702/107; 702/127; 702/132

(58) Field of Classification Search
USPC ......... 702/107, 124, 127, 132, 150, 182, 188; 365/222; 374/176
See application file for complete search history.

(56) References Cited

U.S. PATENT DOCUMENTS

| | | | | |
|---|---|---|---|---|
| 7,492,657 B2 * | 2/2009 | Sako | ............. | 365/222 |
| 8,045,411 B2 * | 10/2011 | Kim et al. | ............. | 365/211 |
| 8,061,895 B2 * | 11/2011 | Tsukude | ............. | 374/176 |
| 2007/0036015 A1 | 2/2007 | Sako | | |

FOREIGN PATENT DOCUMENTS

KR 1020080033588 A 4/2008
KR 100854463 B1 8/2008

* cited by examiner

*Primary Examiner* — Marc Armand
*Assistant Examiner* — Felix Suarez
(74) *Attorney, Agent, or Firm* — William Park & Associates Patent Ltd.

(57) ABSTRACT

A temperature sensor includes a counting signal generation unit, a counting signal decoding unit, an input reference voltage selection unit, and a latch pulse generation unit. The counting signal generation unit is configured to generate one or more counting signals in response to an oscillation signal. The counting signal decoding unit is configured to decode the one or more counting signals and to generate one or more test selection signals and an end signal. The input reference voltage selection unit is configured to output a first selection reference voltage or a second selection reference voltage as an input reference voltage in response to the one or more test selection signals. The latch pulse generation unit is configured to generate one or more latch pulses in response to the one or more test selection signals.

25 Claims, 9 Drawing Sheets

SYNCHRONOUS MULTI-TEMPERATURE SENSOR FOR SEMICONDUCTOR INTEGRATED CIRCUITS

CROSS-REFERENCES TO RELATED APPLICATIONS

The present application claims priority under 35 U.S.C 119(a) to Korean application number 10-2010-0017336, filed on Feb. 25, 2010, in the Korean Intellectual Property Office, which is incorporated herein by reference in its entirety.

BACKGROUND

To meet the demands of the high performance of electronic systems such as personal computers or electronic communication devices, nonvolatile semiconductor memory devices such as DRAMs mounted as memory devices have been designed to operate at higher speed and have become highly integrated. Since semiconductor memory devices mounted on battery-driven systems such as mobile phones or notebook computers require a low power consumption characteristic, many efforts and developments have been made to reduce an operating current and a standby current.

A data retention characteristic of a DRAM cell consisting of one transistor and one storage capacitor is sensitive to temperature. Therefore, it may be necessary to adjust the operating conditions of circuit blocks inside semiconductor integrated circuits, depending on the variation in an ambient temperature. For example, DRAMs used in mobile products adjust a refresh period, depending on the variation in an ambient temperature. Temperature sensors, such as a Digital Temperature Sensor Regulator (DTSR), an Analog Temp Sensor Regulator (ATSR), and a Digital Temperature Compensated Self Refresh (DTCSR), are used to adjust the operating conditions depending on the variation in the ambient temperature.

Figure 1:
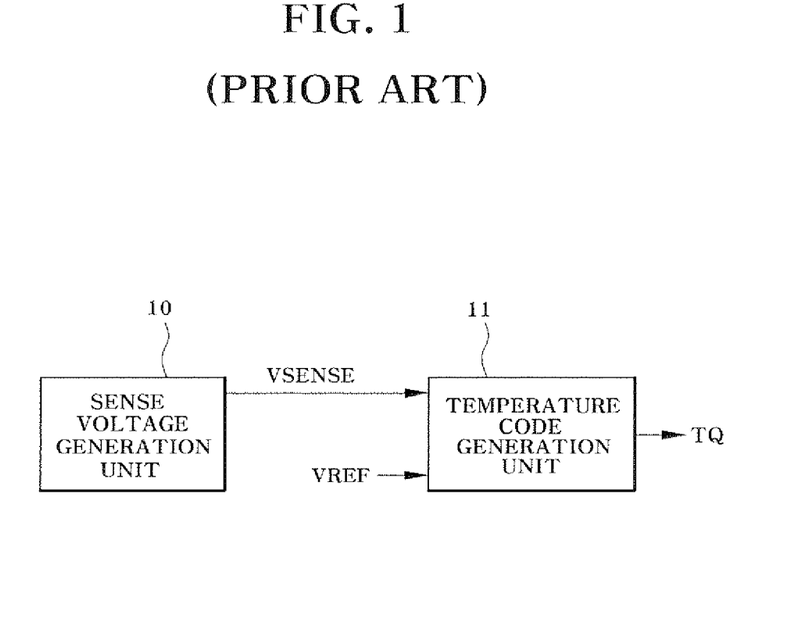
FIG. 1 is a block diagram illustrating the configuration of a conventional temperature sensor.

FIG. 1 is a block diagram illustrating the configuration of a conventional temperature sensor. The conventional temperature sensor includes a sense voltage generation unit 10 and a temperature code generation unit 11. The sense voltage generation unit 10 is configured to sense an inside temperature of a semiconductor integrated circuit and to generate a sense voltage VSENSE based thereon. The temperature code generation unit 11 is configured to compare the sense voltage VSENSE with a reference voltage VREF and to generate a temperature code TQ based thereon. More specifically, the temperature sensor compares a level of the sense voltage VSENSE with a level of the reference voltage VREF and generates the temperature code TQ, which contains information indicating whether an inside temperature of the semiconductor integrated circuit is higher than a temperature corresponding to the level of the reference voltage VREF.

However, such a temperature sensor can sense only one temperature, therefore it is necessary to adjust the level of the reference voltage VREF through a design modification in order to sense multiple temperatures. Furthermore, when the level of the sense voltage VSENSE changes according to process variations, a design modification for adjusting the level of the reference voltage VREF is required.

SUMMARY

An embodiment of the present invention relates to a temperature sensor which is capable of easily sensing a plurality of temperatures, without design modification, and coping with process variations.

In one embodiment, a temperature sensor includes: a counting signal generation unit configured to generate first and second counting signals which are counted in response to an oscillation signal in a test mode; a counting signal decoding unit configured to decode the first and second counting signals and generate first and second test selection signals and an end signal; an input reference voltage selection unit configured to output a first selection reference voltage or a second selection reference voltage as an input reference voltage in response to the first and second test selection signals; and a latch pulse generation unit configured to generate first and second latch pulses in response to the first and second test selection signals.

In another embodiment, a temperature sensor includes: a sense voltage generation unit configured to sense an inside temperature of a semiconductor integrated circuit and generate a sense voltage; a selection signal generation unit configured to generate a selection signal in response to a fuse cutting or a test mode pulse in a first test mode; a reference voltage selection unit configured to select and output first and second selection reference voltages among a plurality of reference voltages in response to the selection signal; and a voltage pulse generation unit configured to be driven in a second test mode, count first and second counting signals in response to an oscillation signal, decode the first and second counting signals to generate first and second test selection signals, and generate an input reference voltage and first and second latch pulses from the first and second test selection signals.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Hereinafter, embodiments of the present invention will be described with reference to accompanying drawings. However, the embodiments are for illustrative purposes only and are not intended to limit the scope of the invention.

Figure 2:
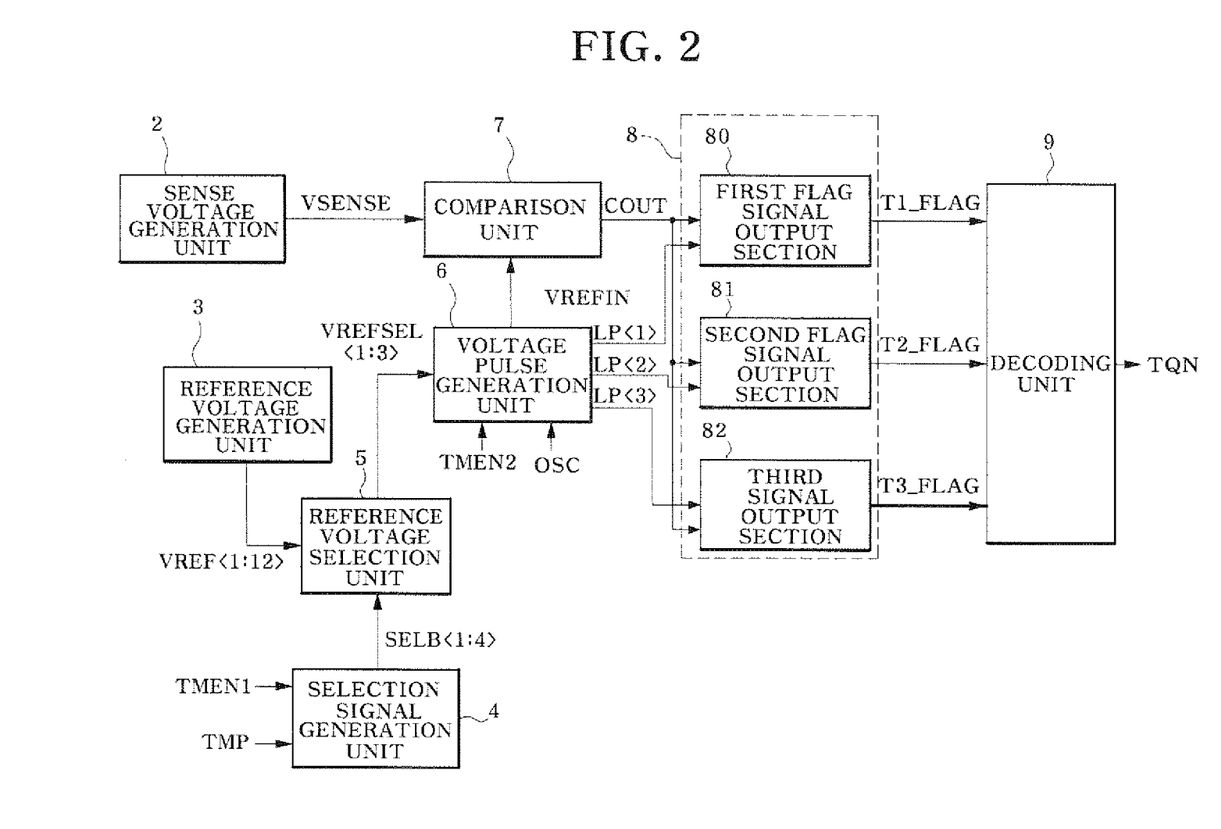
FIG. 2 is a circuit diagram illustrating the configuration of a temperature sensor according to an embodiment of the present invention.

FIG. 2 is a circuit diagram illustrating an example configuration of a temperature sensor according to an embodiment of the present invention. The temperature sensor includes a sense voltage generation unit 2, a reference voltage generation unit 3, a selection signal generation unit 4, a reference voltage selection unit 5, a voltage pulse generation unit 6, a comparison unit 7, a flag signal generation unit 8, and a decoding unit 9.

The sense voltage generation unit 2 is configured to sense an inside temperature of a semiconductor integrated circuit and to generate a sense voltage VSENSE based thereon. The sense voltage generation unit 2 can be implemented using a resistor or a MOS transistor having a different current drivability, which can be dependent on the inside temperature of the semiconductor integrated circuit.

The reference voltage generation unit 3 includes a plurality of resistors and is configured to divide a power supply voltage (VDD) or an internal voltage, and to generate first to twelfth reference voltages VREF<1:12> having levels corresponding to the inside temperatures of the semiconductor integrated circuit. In one example, the twelfth reference voltage VREF<12> can be generated to have a highest level corresponding to a lowest inside temperature of the semiconductor integrated circuit. The first reference voltage VREF<1> can be generated to have a lowest level corresponding to the highest inside temperature of the semiconductor integrated circuit.

The selection signal generation unit 4 is configured to generate first to fourth selection signals SELB<1:4>, which can depend on whether the semiconductor integrated circuit enters a first test mode or not. The selection signal generation unit 4 can include first and second fuses (not shown). When the semiconductor integrated circuit does not enter the first test mode, the selection signal generation unit 4 receives a first test mode signal TMEN1 of a logic low level and generates the first to fourth selection signals SELB<1:4> which are selectively enabled to a logic high level, depending on whether the first and second fuses (not shown) are cut or not. More specifically, when both of the first and second fuses (not shown) are not cut (e.g, the semiconductor integrated circuit does not enter the first test mode), the selection signal generation unit 4 generates the first selection signal SELB<1> which is enabled to a logic high level. When the first fuse (not shown) is cut, the selection signal generation unit 4 generates the second selection signal SELB<2> which is enabled to a logic high level. When the second fuse (not shown) is cut, the selection signal generation unit 4 generates the third selection signal SELB<3> which is enabled to a logic high level. When both of the first and second fuses (not shown) are cut, the selection signal generation unit 4 generates the is fourth selection signal SELB<4> which is enabled to a logic high level.

Furthermore, when the semiconductor integrated circuit enters the first test mode, the selection signal generation unit 4 receives a first test mode signal TMEN1 of a logic high level and generates the first to fourth selection signals SELB<1:4> which are selectively enabled to a logic high level whenever a test mode pulse TMP is input. More specifically, when the test mode pulse TMP is not input, the selection signal generation unit 4 generates the first selection signal SELB<1> which is enabled to a logic high level. When the test mode pulse TMP is input one time, the selection signal generation unit 4 generates the second selection signal SELB<2> which is enabled to a logic high level. When the test mode pulse TMP is input two times, the selection signal generation unit 4 generates the third selection signal SELB<3> which is enabled to a logic high level. When the test mode pulse TMP is input three times, the selection signal generation unit 4 generates the fourth selection signal SELB<4> which is enabled to a logic high level.

The reference voltage selection unit 5 selects and outputs first to third selection reference voltages VREFSEL<1:3>, from among the first to twelfth reference voltages VREF<1:12>, in response to the first to fourth selection signals SELB<1:4>. In one example, when the first selection signal SELB<1> is enabled to a logic high level, the reference voltage selection unit 5 can output the first reference voltage VREF<1>, the fifth reference voltage VREF<5>, and the ninth reference voltage VREF<9> as the first to third selection reference voltages VREFSEL<1:3>, respectively. Also, when the second selection signal SELB<2> is enabled to a logic high level, the reference voltage selection unit 5 can output the second reference voltage VREF<2>, the sixth reference voltage VREF<6>, and the tenth reference voltage VREF<10> as the first to third selection reference voltages VREFSEL<1:3>, respectively. Also, when the third selection signal SELB<3> is enabled to a logic high level, the reference voltage selection unit 5 can output the third reference voltage VREF<3>, the seventh reference voltage VREF<7>, and the eleventh reference voltage VREF<11> as the first to third selection reference voltages VREFSEL<1:3>, respectively. Also, when the fourth selection signal SELB<4> is enabled to a logic high level, the reference voltage selection unit 5 can output the fourth reference voltage VREF<4>, the eighth reference voltage VREF<8>, and the twelfth reference voltage VREF<12> as the first to third selection reference voltages VREFSEL<1:3>, respectively.

The comparison unit 7 is configured to compare the sense voltage VSENSE with the input reference voltage VREFIN and to generate a comparison output signal COUT based thereon. In one example, the comparison output signal COUT can be enabled to a logic high level when the sense voltage VSENSE is lower than the input reference voltage.

The voltage pulse generation unit 6 receives the first to third selection reference voltages VREFSEL<1:3>, the second test mode signal TM_EN2, and the oscillation signal OSC and selects the input reference voltage VREFIN based thereon. The voltage pulse generation unit 6 provides the first, second, and third latch pulses LP<1>, LP<2>, LP<3> based on the selected input reference voltage VREFIN.

As shown, the flag signal generation unit 8 includes a first flag signal output section 80, a second flag signal output section 81, and a third flag signal output section 82.

Figure 3:
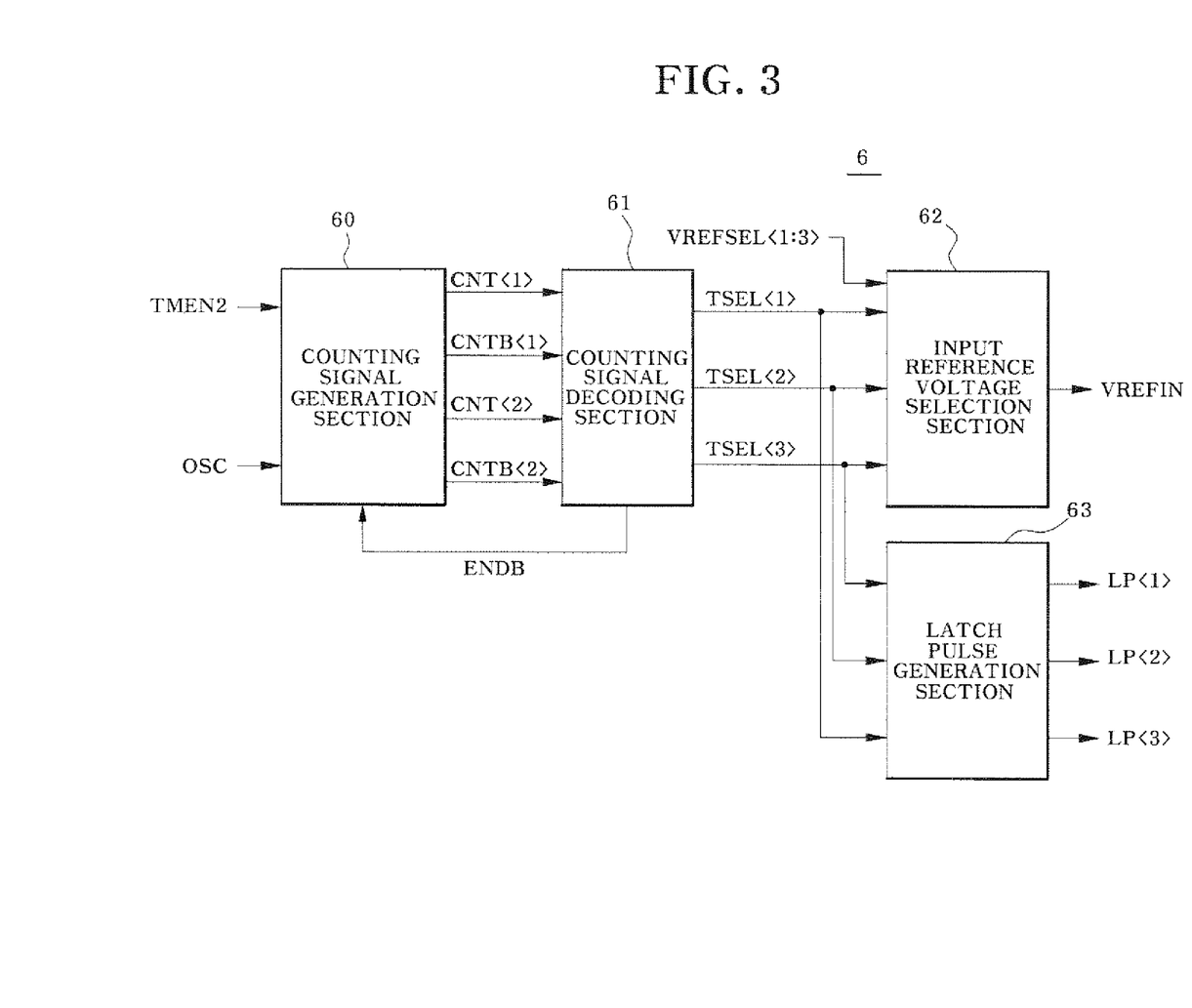
FIG. 3 is a circuit diagram of a voltage pulse generation unit included in the temperature sensor of FIG. 2.

As illustrated in FIG. 3, the voltage pulse generation unit 6 includes a counting signal generation section 60, a counting signal decoding section 61, an input reference voltage selection section 62, and a latch pulse generation section 63. The counting signal generation section 60 is configured to be driven in response to a second test mode signal TM_EN2, which can be enabled to a logic high level when the semiconductor integrated circuit enters a second test mode, and to count first and second counting signals CNT<1>, CNT<2>, respectively, and first and second inverted counting signals CNTB<1>, CNTB<2>, respectively, which are counted in response to an oscillation signal OSC. The counting signal decoding section 61 is configured to decode the first and second counting signals CNT<1>, CNT<2> and the first and second inverted counting signals CNTB<1>, CNTB<2>, and to generate first, second, and third test selection signals TSEL<1>, TSEL<2>, and TSEL<3>, respectively, and an end signal ENDB based thereon. The input reference voltage selection section 62 is configured to select one of the first to third selection reference voltages VREFSEL<1:3> as an input reference voltage VREFIN in response to the first, second, and third test selection signals TSEL<1>, TSEL<2>, TSEL<3>. The latch pulse generation section 63 is configured to receive the first, second, and third test selection signals TSEL<1>, TSEL<2>, TSEL<3> and to generate first, second, and third latch pulses LP<1>, LP<2>, and LP<3>, respectively, based thereon.

Figure 4:
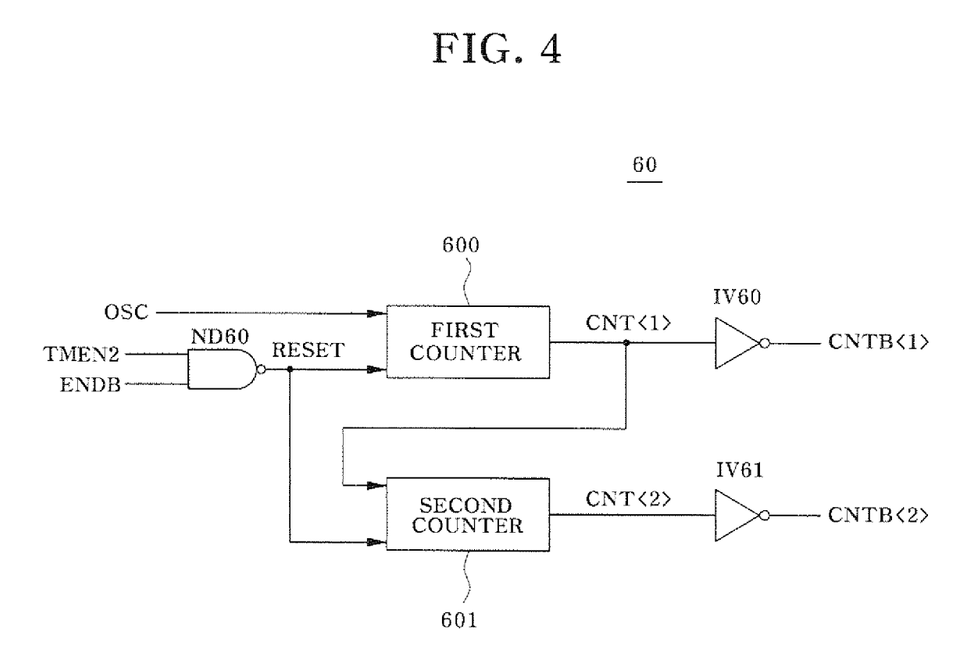
FIG. 4 is a circuit diagram of a counting signal generation section included in the voltage pulse generation unit of FIG. 3.

As illustrated in FIG. 4, the counting signal generation section 60 can include a NAND gate ND60, a first counter 600, a second counter 601, a first inverter IV60, and a second inverter IV61. The NAND gate ND60 is configured to receive the second test mode signal TM_EN2 and the end signal ENDB and to generate a reset signal RESET based thereon. The first counter 600 is configured to count the first counting signal CNT<1> in response to the oscillation signal OSC. The second counter 601 is configured to count the second counting signal CNT<2> in response to the first counting signal CNT<1>. The first inverter IV60 is configured to invert and buffer the first counting signal CNT<1> and to generate the first inverted counting signal CNTB<1> based thereon. The second inverter IV61 is configured to invert and buffer the second counting signal CNT<2> and to generate the second inverted counting signal CNTB<2> based thereon. When the semiconductor integrated circuit does not enter the second test mode, and thus the second test mode signal TM_EN2 is at a logic low level or the end signal ENDB is enabled to a logic low level, the reset signal RESET is enabled to a logic high level which resets the first counter 600 and the second counter 601. As such, the first counting signal CNT<1> and the second counting signal CNT<2> can be set to a logic low level.

Figure 5:
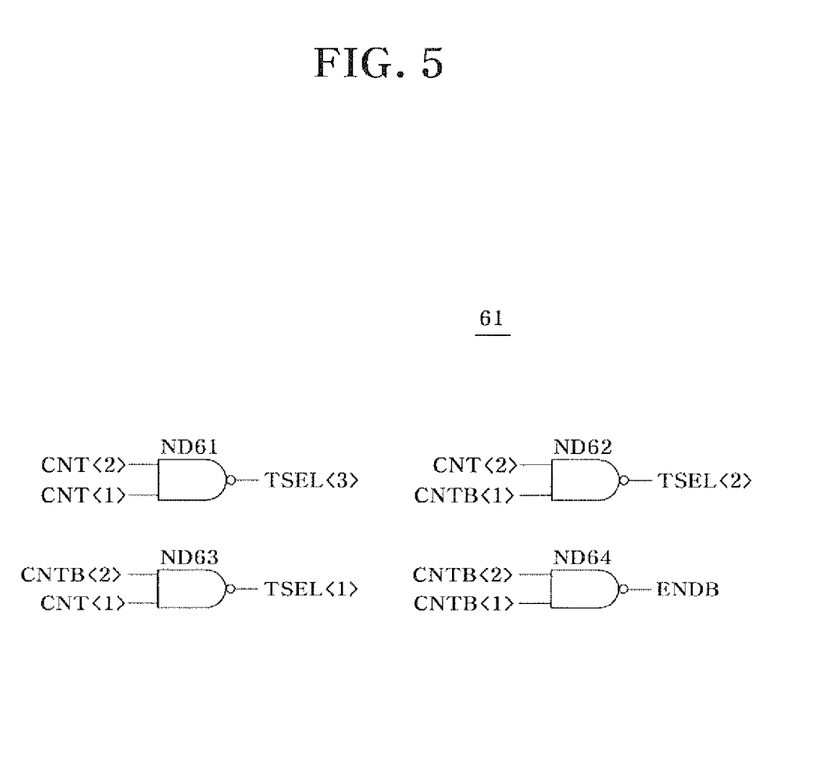
FIG. 5 is a circuit diagram of a counting signal decoding section included in the voltage pulse generation unit of FIG. 3.

As illustrated in FIG. 5, the counting signal decoding section 61 can include a first NAND gate ND61, a second NAND gate ND62, a third NAND gate ND63, and a fourth NAND gate ND64. The first NAND gate ND61 is configured to generate a third test selection signal TSEL<3> by performing a NAND operation on the first counting signal CNT<1> and the second counting signal CNT<2>. The second NAND gate ND62 is configured to generate a second test selection signal TSEL<2> by performing a NAND operation on the first inverted counting signal CNTB<1> and the second counting signal CNT<2>. The third NAND gate ND63 is configured to generate a first test selection signal TSEL<1> by performing a NAND operation on the first counting signal CNT<1> and the second inverted counting signal CNTB<2>. The fourth NAND gate ND64 is configured to generate the end signal ENDB by performing a NAND operation on the first inverted counting signal CNTB<1> and the second inverted counting signal CNTB<2>.

Figure 6:
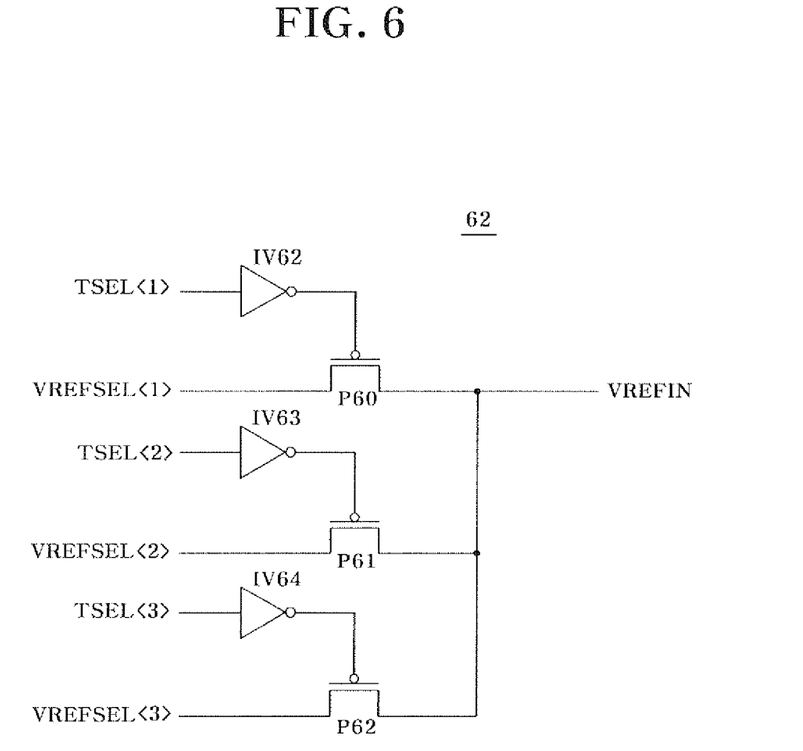
FIG. 6 is a circuit diagram of an input reference voltage selection section included in the voltage pulse generation unit of FIG. 3.

As illustrated in FIG. 6, the input reference voltage selection section 62 can include a first PMOS transistor P60, a second PMOS transistor P61, and a third PMOS transistor P62. Although PMOS transistors are used in this example, other known transistors or switch circuits can be used if desired. The first PMOS transistor P60 operates as a switch configured to turn on in response to an output signal of a third inverter IV62, which is provided by inverting and buffering the first test selection signal TSEL<1>, and to output the first selection reference voltage VREFSEL<1> as the input reference voltage VREFIN. The PMOS transistor P61 operates as a switch configured to turn on in response to an output signal of a fourth inverter IV63, which is provided by inverting and buffering the second test selection signal TSEL<2>, and to output the second selection reference voltage VREFSEL<2> as the input reference voltage VREFIN. The third PMOS transistor P62 operates as a switch configured to turn on in response to an output signal of a fifth inverter IV64, which is provided by inverting and buffering the third test selection signal TSEL<3>, and to output the third selection reference voltage VREFSEL<3> as the input reference voltage VREFIN. As such, input reference voltage selection section 62 outputs the first selection reference voltage VREFSEL<1> as the input reference voltage VREFIN when the first test selection signal TSEL<1> is at a logic high level, the second selection reference voltage VREFSEL<2> as the input reference voltage VREFIN when the second test selection signal TSEL<2> is at a logic high level, and the third selection reference voltage VREFSEL<3> as the input reference voltage VREFIN when the third test selection signal TSEL<3> is at a logic high level.

Figure 7:
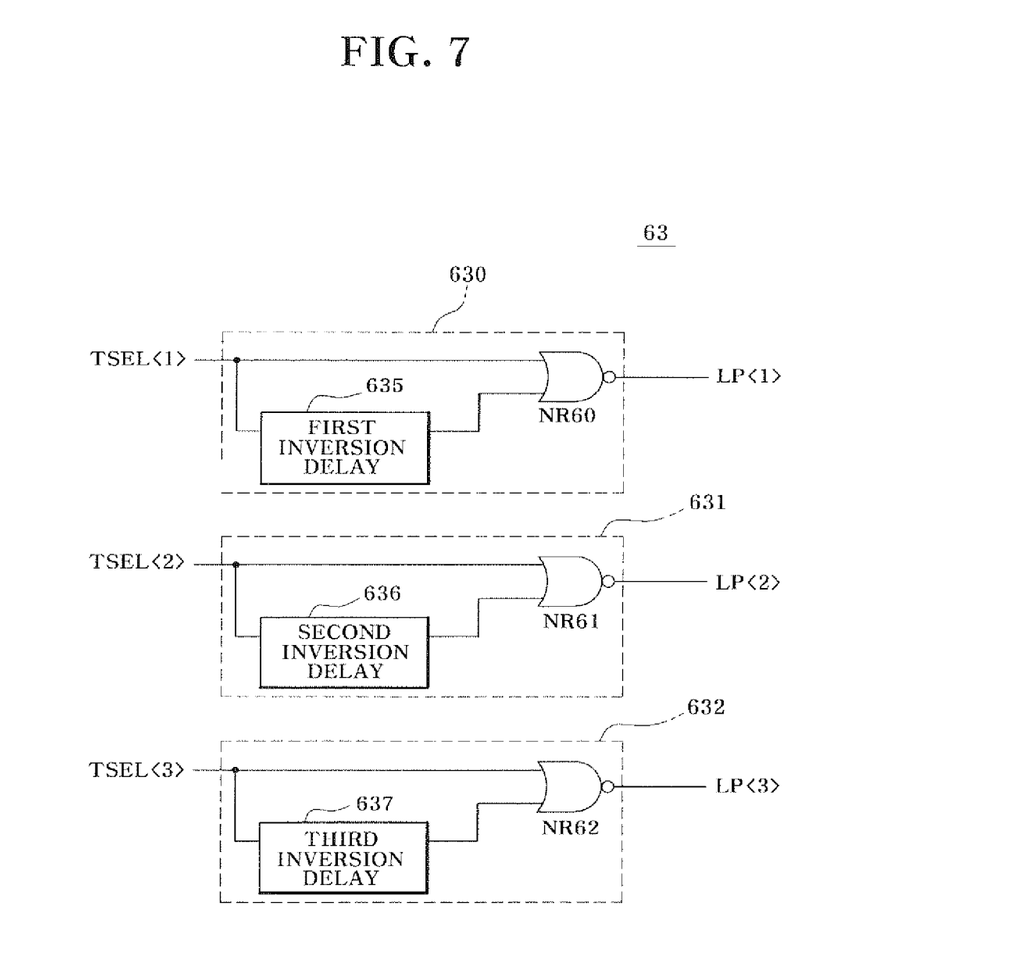
FIG. 7 is a circuit diagram of a latch pulse generation section included in the voltage pulse generation unit of FIG. 3.

As illustrated in FIG. 7, the latch pulse generation section 63 includes a first latch pulse generator 630, a second latch pulse generator 631, and a third latch pulse generator 632. The first latch pulse generator 630 can include a first inversion delay 635 and a first NOR gate NR60. The first inversion delay 635 is configured to invert and delay the first test selection signal TSEL<1> by a predetermined time. The first NOR gate NR60 is configured to generate the first latch pulse LP<1> by performing a NOR operation on the first test selection signal TSEL<1> and an output signal of the first inversion delay 635. The first latch pulse generator 630 generates the first latch pulse LP<1> having a pulse width corresponding to a delay time of the first inversion delay 635, starting from a time at which the first test selection signal TSEL<1> changes from a logic high level to a logic low level. The second latch pulse generator 631 includes a second inversion delay 636 and a second NOR gate NR61. The second inversion delay 636 is configured to invert and delay the second test selection signal TSEL<2> by a predetermined time. The NOR gate NR61 is configured to generate the second latch pulse LP<2> by performing a NOR operation on the second test selection signal TSEL<2> and an output signal of the second inversion delay 636. The second latch pulse generator 631 generates the second latch pulse LP<2> having a pulse width corresponding to a delay time of the second inversion delay 636, starting from a time at which the second test selection signal TSEL<2> changes from a logic high level to a logic low level. The third latch pulse generator 632 includes a third inversion delay 637 and a third NOR gate NR62. The third inversion delay 637 is configured to invert and delay the third test selection signal TSEL<3> by a predetermined time. The third NOR gate NR62 is configured to generate the third latch pulse LP<3> by performing a NOR operation on the third test selection signal TSEL<3> and an output signal of the third inversion delay 637. The third latch pulse generator 632 generates the third latch pulse LP<3> having a pulse width corresponding to a delay time of the third inversion delay 637, starting from a time at which the third test selection signal TSEL<3> changes from a logic high level to a logic low level.

Figure 8:
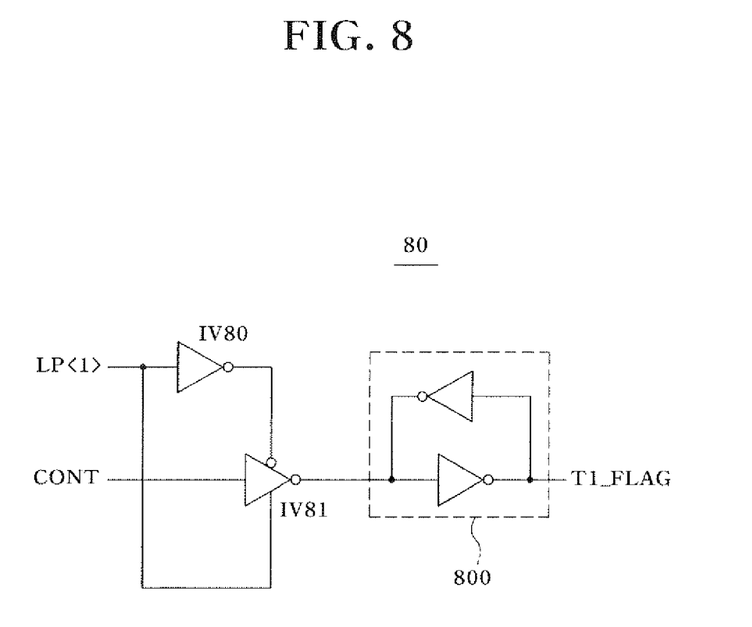
FIG. 8 is a circuit diagram of a first flag signal output section of FIG. 2.

As illustrated in FIG. 8, the first flag signal output section 80 can include a sixth inverter IV81 and a latch 800. The sixth inverter IV81 is configured to invert and buffer the comparison output signal COUT when the first latch pulse LP<1> is at a logic high level. The latch 800 is configured to latch an output signal of the sixth inverter IV81 and to output a first flag signal T1_FLAG based thereon. The first flag signal output section 80 provides the comparison output signal COUT as the first flag signal T1_FLAG during a period in which a logic high level pulse of the first latch pulse LP<1> is input. The configuration of the second flag signal output section 81 and the third flag signal output section 82 is substantially identical to that of the first flag signal output section 80 illustrated in FIG. 8.

The decoding unit 9 is configured to decode a first, second, and third flag signal T1_FLAG, T2_FLAG, and, T3_FLAG, respectively, and to generate a temperature code TQN based thereon. The temperature code TQN can be implemented with a multi-bit signal or other suitable signal.

When the semiconductor integrated circuit enters the second test mode, and thus the second test mode signal TM_EN2 is enabled to a logic high level, the first counter 600 and the second counter 601 of the counting signal generation section 60 are driven to count the first counting signal CNT<1> and the second counting signal CNT<2>.

At this time, the counting signal decoding section 61 decodes the first counting signal CNT<1> and the second counting signal CNT<2>, and generates the first, second, and third test selection signals TSEL<1>, TSEL<2>, TSEL<3> and the end signal ENDB. Table 1, shown below, depicts the logic levels of the first counting signal CNT<1> and the second counting signal CNT<2>, which are counted during the time periods A, B, C and D of the oscillation signal OSC, the logic levels of the first, second, and third test selection signals TSEL<1>, TSEL<2>, TSEL<3>, and the logic level of the end signal ENDB.

TABLE 1

| OSC | CNT<2> | CNT<1> | TSEL<3> | TSEL<2> | TSEL<1> | ENDB |
|---|---|---|---|---|---|---|
| A | H | H | H | L | L | L |
| B | H | L | L | H | L | L |
| C | L | H | L | L | H | L |
| D | L | L | L | L | L | H |

Figure 9:
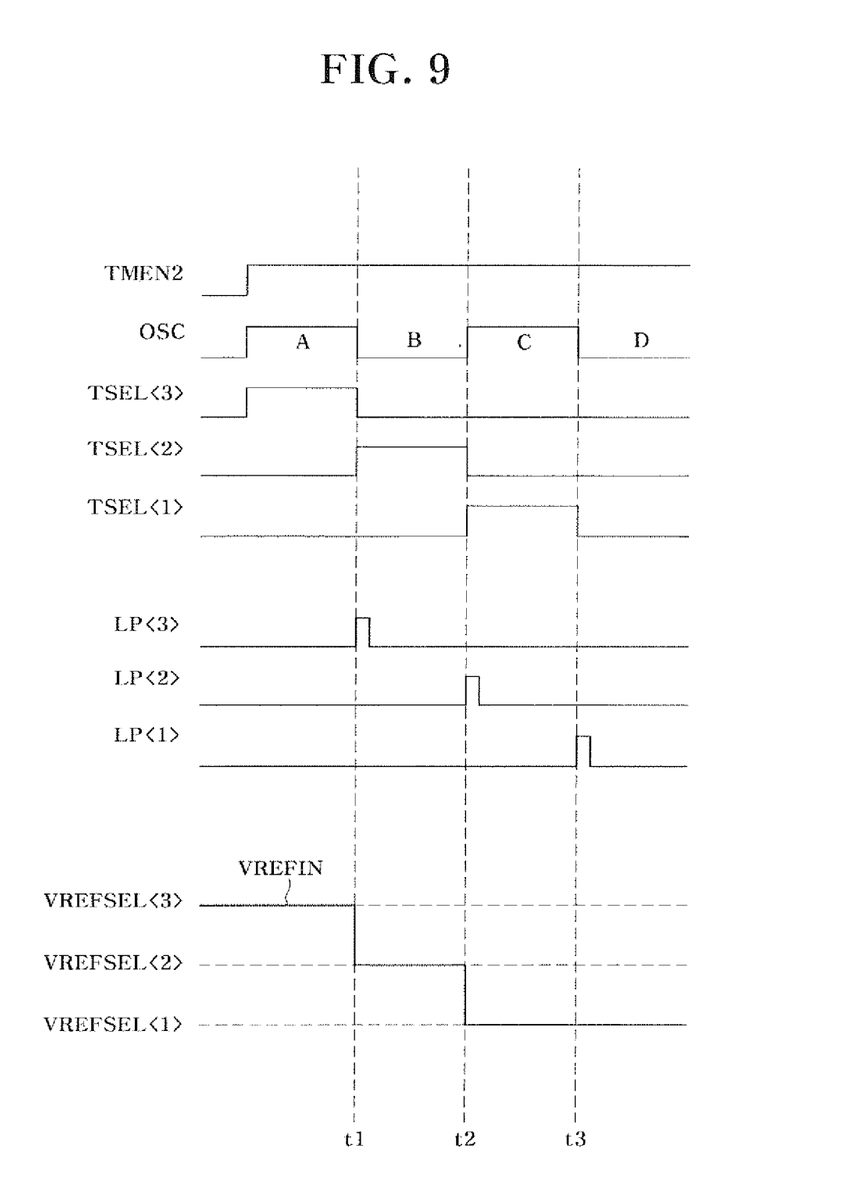
FIG. 9 is a timing diagram depicting the operation of the voltage pulse generation unit of FIG. 3.

FIG. 9 is an example timing diagram depicting the operation of the voltage pulse generation unit 6. As shown, the input reference voltage selection section 62 receives the third test selection signal TSEL<3> which is enabled to a logic high level in the time period A of the oscillation signal OSC, and outputs the third selection reference voltage VREFSEL<3> as the input reference voltage VREFIN. The input reference voltage selection section 62 receives the second test selection signal TSEL<2> which is enabled to a logic high level in the time period B of the oscillation signal OSC, and outputs the second selection reference voltage VREFSEL<2> as the input reference voltage VREFIN. The input reference voltage selection section 62 receives the first test selection signal TSEL<1> which is enabled to a logic high level in the time period C of the oscillation signal OSC, and outputs the first selection reference voltage VREFSEL<1> as the input reference voltage VREFIN.

Also, the latch pulse generation section 63 generates the third latch pulse LP<3> at time t1 when the third test selection signal TSEL<3> changes from a logic high level to a logic low level. The latch pulse generation section 63 generates the second latch pulse LP<2> at time t2 when the second test selection signal TSEL<2> changes from a logic high level to a logic low level. The latch pulse generation section 63 generates the first latch pulse LP<1> at time t3 when the first test selection signal TSEL<1> changes from a logic high level to a logic low level.

Next, the comparison unit 7 compares the level of the sense voltage VSENSE with the level of the input reference voltage VREFIN, and generates the comparison output signal COUT, which is enabled to a logic high level when the level of the sense voltage VSENSE is lower than the level of the input reference voltage VREFIN.

Referring to FIGS. 2 and 9, the flag signal generation unit 8 outputs the comparison output signal COUT as the third flag signal T3_FLAG during a time period where a logic high level pulse of the third latch pulse LP<3> is input. The flag signal generation unit 8 outputs the comparison output signal COUT as the second flag signal T2_FLAG during a time period where a logic high level pulse of the second latch pulse LP<2> is input. The flag signal generation unit 8 outputs the comparison output signal COUT as the first flag signal T1_FLAG during a time period where a logic high level pulse of the first latch pulse LP<1> is input.

The decoding unit 9 decodes the first, second, and third flag signals T1_FLAG, T2_FLAG, and T3_FLAG and generates the temperature code TQ based thereon.

The above-described temperature sensor according to an embodiment of the present invention sequentially outputs a plurality of selection reference voltages VREFSEL<1:3> as an input reference voltage VREFIN by using the oscillation signal OSC. Therefore, a plurality of temperatures can be sensed by comparing the sense voltage VSENSE with the plurality of selection reference voltages VREFSEL<1:3> through the single comparison unit 7.

Furthermore, when the level of the sense voltage VSENSE changes depending on process variations, the temperature sensor according to an embodiment of the present invention changes the levels of the first to fourth selection reference voltages VREFSEL<1:3> by cutting the fuses or inputting the test mode pulse TMP, thereby coping with the process variations without design modification.

An embodiment of the present invention has been disclosed above for illustrative purposes. Those skilled in the art will appreciate that various modifications, additions and substitutions are possible, without departing from the scope and spirit of the invention as disclosed in the accompanying claims.

What is claimed is:

1. A temperature sensor comprising:
    a counting signal generation unit configured to generate at least one counting signal in response to an oscillation signal;
    a counting signal decoding unit configured to decode the at least one counting signal and to generate at least one test selection signal and an end signal based thereon;
    an input reference voltage selection unit configured to output one of a first selection reference voltage and a second selection reference voltage as an input reference voltage in response to the at least one test selection signal; and
    a latch pulse generation unit configured to generate at least one latch pulse in response to the at least one test selection signal,
    wherein the counting signal generation unit is configured to generate a reset signal that resets the at least one counting signal in response to the end signal.

2. The temperature sensor of claim 1, wherein the counting signal generation unit comprises:
    a first counter configured to generate a first counting signal of the at least one counting signal in response to the oscillation signal;
    a second counter configured to generate a second counting signal of the at least one counting signal in response to the first counting signal; and
    a logic element configured to receive a test mode signal and the end signal, and to generate the reset signal based thereon, wherein the reset signal is operative to reset the first counter and the second counter.

3. The temperature sensor of claim 2, wherein the reset signal is enabled when at least one of the test mode signal is disabled and the end signal is enabled.

4. The temperature sensor of claim 1, wherein the input reference voltage selection unit comprises:

a first switch configured to provide the first selection reference voltage as the input reference voltage in response to a first test selection signal of the at least one test selection signal; and a second switch configured to provide the second selection reference voltage as the input reference voltage in response to a second test selection signal of the at least one test selection signal.

5. The temperature sensor of claim 1, wherein the latch pulse generation unit comprises:

a first latch pulse generation section configured to generate a first latch pulse of the at least one latch pulse in response to a first test selection signal of the at least one test selection signal; and a second latch pulse generation section configured to generate a second latch pulse of the at least one latch pulse in response to a second test selection signal of the at least one test selection signal.

6. The temperature sensor of claim 5, wherein the first latch pulse generation section is configured to generate the first latch pulse when the first test selection signal transitions from one logical state to another.

7. The temperature sensor of claim 6, wherein the first latch pulse generation section comprises:

an inversion delay configured to provide an inversion delay signal by inverting and delaying the first test selection signal by a predetermined time; and a logic element configured to generate the first latch pulse by performing a logic operation on the first test selection signal and the inversion delay signal.

8. The temperature sensor of claim 5, wherein the second latch pulse generation section is configured to generate the second latch pulse when the second test selection signal transitions from one logical state to another.

9. The temperature sensor of claim 8, wherein the second latch pulse generation section comprises:

an inversion delay configured to provide an inversion delay signal by inverting and delaying the second test selection signal by a predetermined time; and a logic element configured to generate the second latch pulse by performing a logic operation on the second test selection signal and the inversion delay signal.

10. The temperature sensor of claim 1, further comprising:

a sense voltage generation unit configured to sense an inside temperature of a semiconductor integrated circuit and to generate a sense voltage based thereon;

a comparison unit configured to compare the sense voltage with the input reference voltage and to generate a comparison output signal based thereon;

a flag signal generation unit configured to latch the comparison output signal in response to the at least one latch pulse and to generate at least one flag signal based thereon; and a decoding unit configured to decode the at least one flag signal and generate a temperature code based thereon.

11. The temperature sensor of claim 10, wherein the comparison unit is configured to generate the comparison output signal when the sense voltage is lower than the input reference voltage.

12. The temperature sensor of claim 10, wherein the flag signal generation unit comprises:

a first flag signal output section configured to provide a first latched comparison output by latching the comparison output signal in response to a first latch pulse of the at least one latch pulse, and to output the first latched comparison output signal as a first flag signal of the at least one flag signal; and a second flag signal output section configured to provide a second latched comparison output by latching the first comparison output signal in response to a second latch pulse of the at least one latch pulse, and to output the second latched comparison output signal as a second flag signal of the at least one flag signal.

13. The temperature sensor of claim 12, wherein the first flag signal output section comprises:

a buffer configured to buffer the comparison output signal in response to the first latch pulse; and a latch configured to latch an output signal of the buffer.

14. A temperature sensor comprising:

a sense voltage generation unit configured to sense an inside temperature of a semiconductor integrated circuit and to generate a sense voltage based thereon;

a selection signal generation unit configured to generate a selection signal in response to one of a fuse cutting and a test mode pulse;

a reference voltage selection unit configured to select and output at least one selection reference voltage from a plurality of reference voltages in response to the selection signal; and a voltage pulse generation unit configured to generate at least one counting signal in response to an oscillation signal, to decode the at least one counting signal to generate at least one test selection signal and an end signal, and to generate an input reference voltage and at least one latch pulse based on the at least one test selection signal, and to generate a reset signal that resets the at least one counting signal in response to the end signal.

15. The temperature sensor of claim 14, wherein, the selection signal generation unit is operative to selectively generate first and second selection signals based on the fuse cutting, and to selectively generate the first and second selection signal based on a number of input pulses.

16. The temperature sensor of claim 15, wherein the reference voltage selection unit is configured to provide one of a first and second reference voltage from the plurality of reference voltages as a first selection reference voltage of the at least one selection reference voltage in response to the first and second selection signals, and to output one of a third and fourth reference voltage from the plurality of reference voltages as a second selection reference voltage of the at least one selection reference voltage in response to the first and second selection signals.

17. The temperature sensor of claim 14, wherein the voltage pulse generation unit comprises:

a counting signal generation section configured to generate the at least one counting signal in response to the oscillation signal;

a counting signal decoding section configured to decode the at least one counting signal and to generate first and second test selection signals and an end signal based thereon;

an input reference voltage selection section configured to output one of a first selection reference voltage and a second selection reference voltage of the at least one selection reference voltage as the input reference voltage in response to the first and second test selection signals; and a latch pulse generation section configured to generate first and second latch pulses of the at least one latch pulse in response to the first and second test selection signals.

18. The temperature sensor of claim 17, wherein the counting signal generation section comprises:
- a first counter configured to generate a first counting signal of the at least one counting signal in response to the oscillation signal;
- a second counter configured to generate a second counting signal of the at least one counting signal in response to the first counting signal; and
- a logic element configured to receive a test mode signal and to generate the reset signal based thereon, wherein the reset signal is operative to reset the first counter and the second counter.

19. The temperature sensor of claim 18, wherein the reset signal is enabled when at least one of the test mode signal is disabled and the end signal is enabled.

20. The temperature sensor of claim 17, wherein the input reference voltage selection section comprises:
- a first switch configured to provide the first selection reference voltage as the input reference voltage in response to the first test selection signal; and
- a second switch configured to provide the second selection reference voltage as the input reference voltage in response to the second test selection signal.

21. The temperature sensor of claim 17, wherein the latch pulse generation section comprises:
- a first latch pulse generator configured to generate the first latch pulse when the first test selection signal transitions from one logical state to another; and
- a second latch pulse generator configured to generate the second latch pulse when the second test selection signal transitions from one logical state to another.

22. The temperature sensor of claim 14, further comprising:
- a comparison unit configured to compare the sense voltage with the input reference voltage and to generate a comparison output signal based thereon;
- a flag signal generation unit configured to latch the comparison output signal in response to the at least one latch pulse and to generate first and second flag signals based thereon; and
- a decoding unit configured to decode the first and second flag signals and to generate a temperature code based thereon.

23. The temperature sensor of claim 22, wherein the comparison unit is configured to generate the comparison output signal when the sense voltage is lower than the input reference voltage.

24. The temperature sensor of claim 22, wherein the flag signal generation unit comprises:
- a first flag signal output section configured to provide a latched comparison output signal by latching the comparison output signal in response to the first latch pulse, and to output the latched comparison output signal as the first flag signal; and
- a second flag signal output section configured to latch the latched comparison output signal in response to the second latch pulse, and to output the latched comparison output signal as the second flag signal.

25. The temperature sensor of claim 24, wherein the first flag signal output section comprises:
- a buffer configured to buffer the latched comparison output signal in response to the first latch pulse; and
- a latch configured to latch an output signal of the buffer.

* * * * *